No. 757,825. PATENTED APR. 19, 1904.
A. MAUL.
ROCKET APPARATUS FOR TAKING PHOTOGRAPHS.
APPLICATION FILED JUNE 20, 1903.
NO MODEL.
2 SHEETS—SHEET 1.
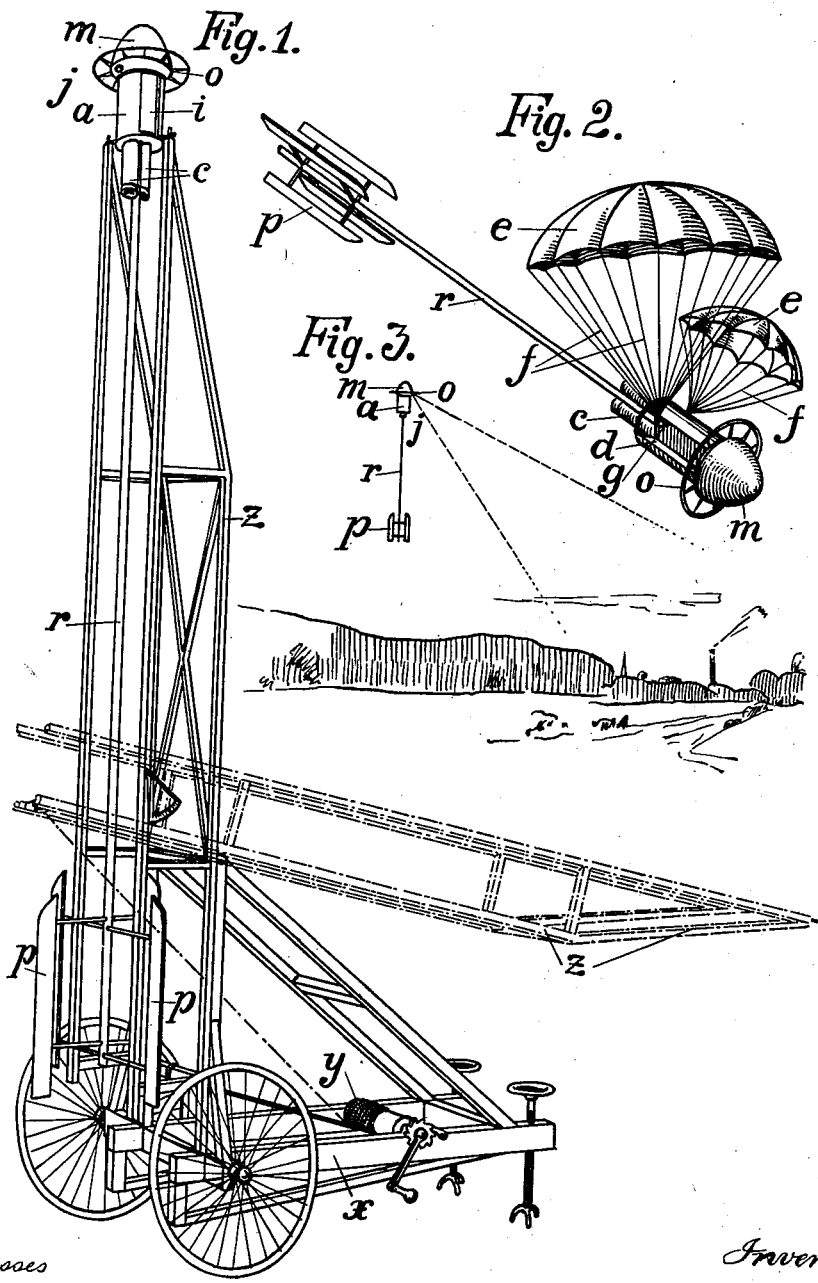

No. 757,825. PATENTED APR. 19, 1904.
A. MAUL.
ROCKET APPARATUS FOR TAKING PHOTOGRAPHS.
APPLICATION FILED JUNE 20, 1903.
NO MODEL.
2 SHEETS—SHEET 2.

I-I

Witnesses
Chas. H. Smith
A. P. Birrell

Inventor
Alfred Maul
per Harold Birrell
atty

No. 757,825.

Patented April 19, 1904.

UNITED STATES PATENT OFFICE.

ALFRED MAUL, OF DRESDEN, GERMANY.

ROCKET APPARATUS FOR TAKING PHOTOGRAPHS.

SPECIFICATION forming part of Letters Patent No. 757,825, dated April 19, 1904.

Application filed June 20, 1903. Serial No. 162,330. (No model.)

*To all whom it may concern:*

Be it known that I, ALFRED MAUL, a subject of the King of Saxony, residing at Dresden, in the Kingdom of Saxony, German Empire, have invented an Improvement in Rocket Apparatus for Taking Photographs, of which the following is a specification.

This invention relates to an apparatus for automatically taking photographs or other photographic pictures of bird's-eye views of the ground and the like. For this purpose the apparatus is inclosed within a projectile-shaped casing carrying laterally an object-lens, and the upward movement of the apparatus is effected by the ignition or explosion of a charge of powder in the form of rockets inserted within the apparatus itself.

I am aware that it has been proposed to take photographs of bird's-eye views of the ground by means of rockets or gun-projectiles in such a manner that a photographic apparatus or camera is connected to the projectile or to a parachute within such projectile and from which the parachute is disengaged at a suitable moment, as described in German Patent No. 64,209.

The object of my invention is to provide an apparatus in which a photograph of the ground may be taken laterally or from the side of the instrument and not vertically beneath the same, and this is accomplished by arranging the object-lens obliquely to the ground during the nearly-vertical upward movement of the apparatus. The apparatus returns to its starting-point by gravity, provided it is not deflected from its course by the wind; but any deflection by the wind is so small in most cases as to be negligible. Furthermore, the taking of the photograph is effected during the upward movement of the apparatus or at the latest at the moment when the apparatus reaches its highest point before the apparatus begins its downward movement. Finally, the apparatus according to the present invention is provided with an arrangement of wings or blades which effectually obviate a rotating or oscillating movement of the apparatus when in its upward flight, such rotation or oscillation being caused by the propelling means or by the wind, so that the object-lens may be adjusted in a precise direction in order to photograph a certain section of the ground.

Figure 4:
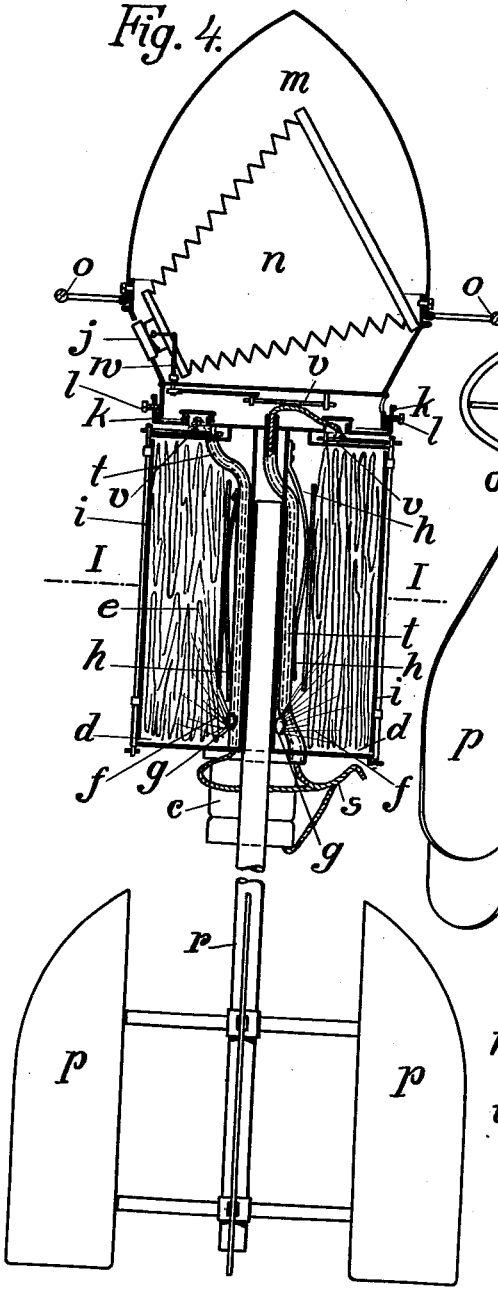
Figure 5:
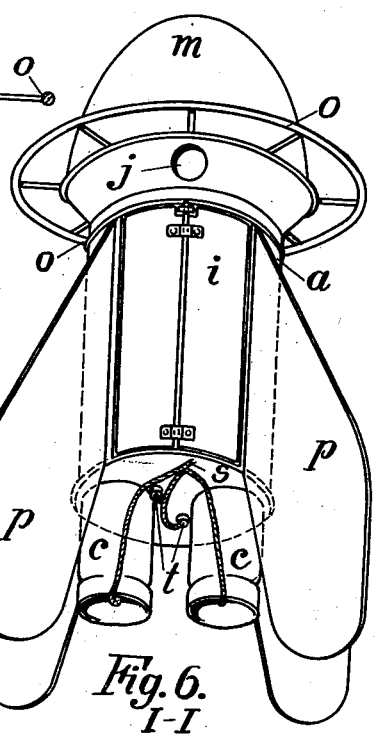
Figure 6:
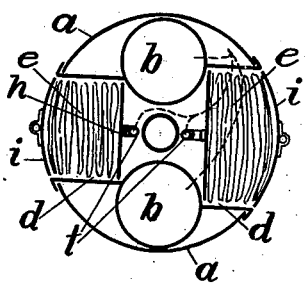

In the drawings, Figure 1 is a perspective view of the rocket apparatus suspended within a frame-carriage and ready for starting. Fig. 2 is a view of the apparatus during its downward movement and with the parachutes opened. Fig. 3 is a diagrammatic view of the apparatus in its upward flight. Fig. 4 is a sectional view of the apparatus provided with a tail-rod to which the wings or blades are fixed. Fig. 5 is a perspective view of a modified form of the apparatus in which the wings or blades are situated on the outer surface of the casing; and Fig. 6 is a sectional plan of the casing on the line I I, Fig. 4, showing the apparatus on the line I I, Fig. 4, showing the position of the rockets and the parachutes within the casing.

The cylindrical casing $a$ is provided with compartments $b$, preferably of circular section. In the apparatus shown two such compartments are provided for receiving the rockets $c$, containing the charge of powder. These rockets are ignited at their lower ends, which protrude a certain length from the casing, and effect by their explosive power the upward movement of the entire apparatus to a height of sixteen hundred to seventeen hundred feet, and the duration of this upward movement is but a few seconds. Any suitable number of rockets may be employed, depending upon the size of the apparatus and the height to which the same is to be raised. Two compartments $d$ are also provided within the casing and adapted to receive the two parachutes $e$, of unequal size, fixed by their ropes or cords $f$ to a common ring $g$ on the inner wall of the casing. The collapsed parachutes $e$ are normally retained within the casing by detachably-arranged plates $i$ and are pressed against said plates by springs $h$, the said plates $i$ forming the outer wall of the casing.

A cap $m$, terminating in a point and containing an apparatus $n$ for taking photographs, is arranged above the cylindrical casing $a$ and detachably connected thereto by a ring-shaped band $k$ and by screw-bolts $l$. The object-lens $j$ of the photographic apparatus is inserted in the lower reduced part of the cap $m$ in a position oblique to the longitudinal axis of the entire apparatus. A projecting ring $o$ is placed around the cap to protect the object-lens from injury as the apparatus strikes the ground at the end of its downward flight.

Wings or blades $p$ are provided to prevent the apparatus from having a rotating movement in its upward travel and are placed either directly on the cylindrical casing of the apparatus, as shown in Fig. 5, or fixed to the free end of a tail-rod $r$, such rod consisting, preferably, of a thin tube of metal serving at the same time to equalize the weight and to insure a greater resistance to keep the apparatus in its course and preventing tilting in windy weather. Instead of a plurality of wings, four of which are shown in the figures, any desired number may be employed.

The ignition of the powder charge of the rockets $c$ is effected by a fuse $s$ in any well-known manner, and time-fuses situated in the channels $t$ are connected to and ignited by the fuse $s$ to successively disengage the instantaneous shutter of the photographic apparatus by burning away the celluloid strips $v$ or the like, releasing the closing plate of the compartment containing the small parachute, and finally that of the large parachute. These time-fuses may be replaced, preferably, by a clockwork disengaging the three parts mentioned before and precisely adjusted at suitable times.

A frame $z$, Fig. 1, capable of being laid or swung down on a traveling carriage $x$ by a winch $y$ and adjustable in any angle of inclination, serves for supporting and guiding the apparatus during the first part of its upward movement, as the wings or blades $p$ are arranged to slide in guides arranged in the frame.

The photograph is taken during the upward travel of the apparatus or as soon as the same has reached its greatest height, and as the apparatus begins to descend the heavy head will tend to incline toward the ground. At this moment, or shortly before, the smaller parachute $j$ disengaged and attains its open position, thereby somewhat retarding the descent of the apparatus. Nevertheless this descent is so rapid that a projectile discharged by an enemy will scarcely reach the apparatus. If the apparatus is at a distance of three hundred or one hundred and fifty feet or less apart from the ground, the apparatus is retained with a greater force by the larger parachute now being opened and moves down only slowly, whereupon it is received by the persons who are using it.

Instead of the tails provided in the apparatus in the form of a rod a tail-rope or a line may be provided, if necessary. Furthermore, it may be preferable to insert ball-bearings between the casing $a$ and the cap $m$ in such a manner that both parts may rotate easily and independent one from another. In this case the rod $r$ is preferably passed loosely through the casing and fixed to the cap $m$ for the purpose of transmitting no rotary movement to the cap $m$ from the casing $a$, which may be caused by a firing not precisely vertical in consequence of an oblique position of the rockets or of unequal charges of power.

I claim as my invention—

1. In a rocket apparatus for taking photographs, the combination with a casing having compartments adapted to receive rockets, of a cap, means for securing said cap to said casing, and a photographic apparatus within said cap and set obliquely to the axis of the rocket apparatus.

2. In a rocket apparatus for taking photographs, the combination with a cylindrical casing, of a cap, means for securing said cap to said casing, a photographic apparatus within said cap and set obliquely to the axis of said rocket apparatus and means for projecting the said rocket apparatus upward.

3. In a rocket apparatus for taking photographs the combination with a casing, of a cap, means for connecting said cap to said casing, a photographic apparatus within said cap and set obliquely to the axis of the apparatus, means for projecting said rocket apparatus upward and means for operating said photographic apparatus at a predetermined time.

4. In a rocket apparatus for taking photographs, the combination with a casing, of a cap, means for connecting said cap to said casing, a photographic apparatus within said cap and set obliquely to the axis of the apparatus, means for projecting said rocket apparatus upward, means for operating said photographic apparatus at a predetermined time, and means for preventing a rotary motion of the apparatus in its upward flight.

5. In a rocket apparatus for taking photographs, the combination with a casing, of a cap, means for connecting said cap to said casing, a photographic apparatus within said cap and set obliquely to the axis of the apparatus, means for projecting said rocket apparatus upward, means for operating said photographic apparatus at a predetermined time, means for preventing a rotary motion of the apparatus in its upward flight, at least one parachute, means for normally retaining and securing the same to and within said casing, and means for releasing and ejecting the same from the said casing at a predetermined time.

6. In a rocket apparatus for taking photographs, the combination with a casing having compartments adapted to receive rockets, of a cap, a band secured to one end of said casing and screw-bolts passing through said band by means of which the said cap is connected to the casing, and a photographic apparatus within said cap and set obliquely to the axis of the apparatus.

7. In a rocket apparatus for taking photographs, the combination with a cylindrical casing having compartments therein adapted to receive rockets, of a cap, a metal band secured to one end of said casing and screw-bolts passing through the same and by which the said cap is connected to the casing, a photographic apparatus within said cap and set obliquely to the axis of the apparatus and rockets in the said compartments for receiving the same for projecting the apparatus upward.

8. In a rocket apparatus for taking photographs, the combination with a casing having compartments therein adapted to receive rockets, of a cap, a metallic band secured to one end of the said casing, screw-bolts passing through the same by means of which the said cap is connected to the casing, a photographic apparatus within said cap and set obliquely to the axis of the apparatus, rockets placed within the said compartments for receiving the same and a time-fuse for operating the said photographic apparatus at a predetermined moment.

9. In a rocket apparatus for taking photographs, the combination with a casing having compartments therein adapted to receive rockets, of a cap, a metallic band secured to one end of the said casing, screw-bolts passing through the same by means of which the said cap is connected to the casing, a photographic apparatus within said cap and set obliquely to the axis of the apparatus, rockets placed within the said compartments for receiving the same, a time-fuse for operating said photographic apparatus at a predetermined moment, a rod connected to said casing and blades secured to the end of said rod for preventing any rotary motion of the apparatus in its upward flight.

10. In a rocket apparatus for taking photographs, the combination with a casing having rocket-compartments and parachute-compartments, of a cap, a metallic band secured to one end of the said casing, screw-bolts passing through the same by means of which the said cap is connected to the casing, a photographic apparatus within said cap and set obliquely to the axis of the apparatus, rockets placed within the said compartments for receiving the same, a time-fuse for operating said photographic apparatus at a predetermined moment, a rod connected to said casing, blades secured to the end of said rod for preventing any rotary motion of the apparatus in its upward flight, a parachute in each of said parachute-compartments, plates closing said parachute-compartments, devices for normally maintaining said plates in a closed relation for retaining and securing the parachutes to and within said compartments and controlled by said time-fuse for releasing said plates, and springs for ejecting the said parachutes from said compartments after the said plates have been released.

In witness whereof I have hereunto set my hand in presence of two witnesses.

ALFRED MAUL.

Witnesses:
 RUDOLF SCHMIDT,
 PAUL E. SCHILLING.